United States Patent [19]

Ballweg

[11] Patent Number: 4,922,438
[45] Date of Patent: May 1, 1990

[54] METHOD AND APPARATUS FOR READING PACKET-ORIENTED DATA SIGNALS INTO AND OUT OF A BUFFER

[75] Inventor: Adolf Ballweg, Germering, Fed. Rep. of Germany

[73] Assignee: Siemens Aktiengesellschaft, Berlin and Munich, Fed. Rep. of Germany

[21] Appl. No.: 122,834

[22] Filed: Nov. 19, 1987

[30] Foreign Application Priority Data

Dec. 11, 1986 [DE] Fed. Rep. of Germany ....... 3642392

[51] Int. Cl.$^5$ .............................................. H04L 7/00
[52] U.S. Cl. ................................. 370/85.15; 370/94.1;
370/105.3; 364/939; 364/940.61; 364/948.31;
364/239; 364/284; 364/242.94; 364/239.51;
375/117
[58] Field of Search ... 364/200 MS File, 900 MS File;
375/118, 117; 370/60, 84, 85.15, 94.1, 105.3

[56] References Cited

U.S. PATENT DOCUMENTS

| | | | |
|---|---|---|---|
| 3,988,544 | 10/1976 | Texier et al. | 370/84 |
| 4,040,027 | 8/1977 | Van Es et al. | 364/900 |
| 4,525,849 | 6/1985 | Wolf | 375/118 |
| 4,569,062 | 2/1986 | Dellande et al. | 375/117 |
| 4,752,924 | 6/1988 | Darnell et al. | 370/85.15 |
| 4,780,870 | 10/1988 | McHarg et al. | 370/85.15 |
| 4,788,679 | 11/1988 | Kataoka et al. | 370/60 |
| 4,809,267 | 2/1989 | Higuchi et al. | 370/85.15 |
| 4,821,227 | 4/1989 | Naito | 364/900 |

Primary Examiner—Gareth D. Shaw
Assistant Examiner—Gopal C. Ray
Attorney, Agent, or Firm—Hill, Van Santen, Steadman & Simpson

[57] ABSTRACT

A method and apparatus for controlling read-in and read-out of serial or parallel packet-oriented data signals with respect to a buffer in a communication terminal provides for the identification of a packet start bit combination in incoming packet-oriented data signals before initialization of the reading of the data signals into the buffer and initialization for reading out the data signals after a prescribed delay time with reading terminated after the identification of a packet end bit combination and/or a bit combination indicating stuffing bits between end and start bit combinations. Read-out is terminated after the identification of a packet end bit combination or of a bit combination indicating stuffing information at the data output of the buffer or given equality of the read-in and read-out addresses, assuming a packet end bit combination and/or a bit combination indicating stuffing information is identified at the data output of the buffer. The method and apparatus serve the purpose of phase and clock frequency matching between the data bit clock of the incoming data signals and the processing clock of a communication terminal in, for example, a ring-shaped network.

17 Claims, 2 Drawing Sheets

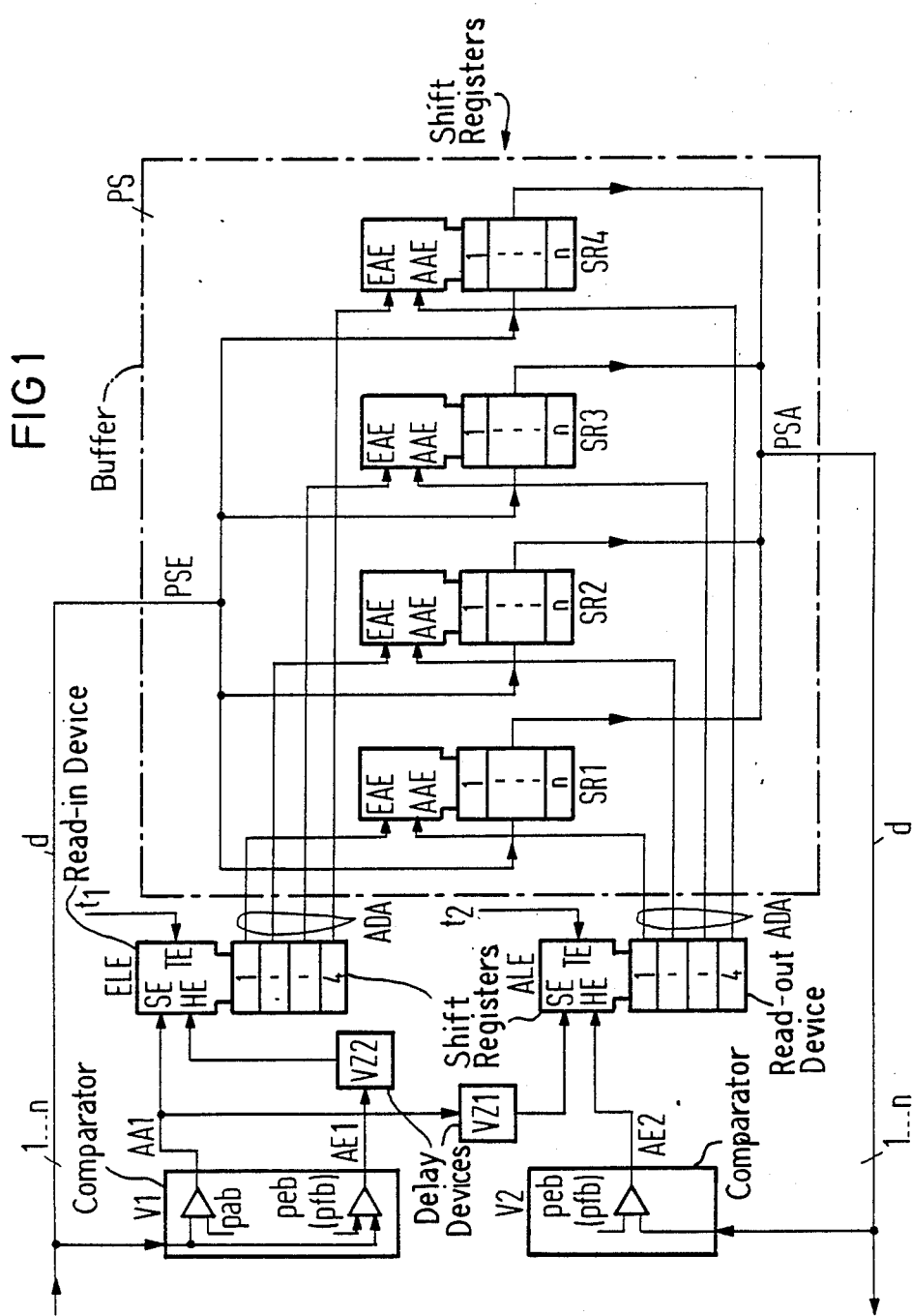

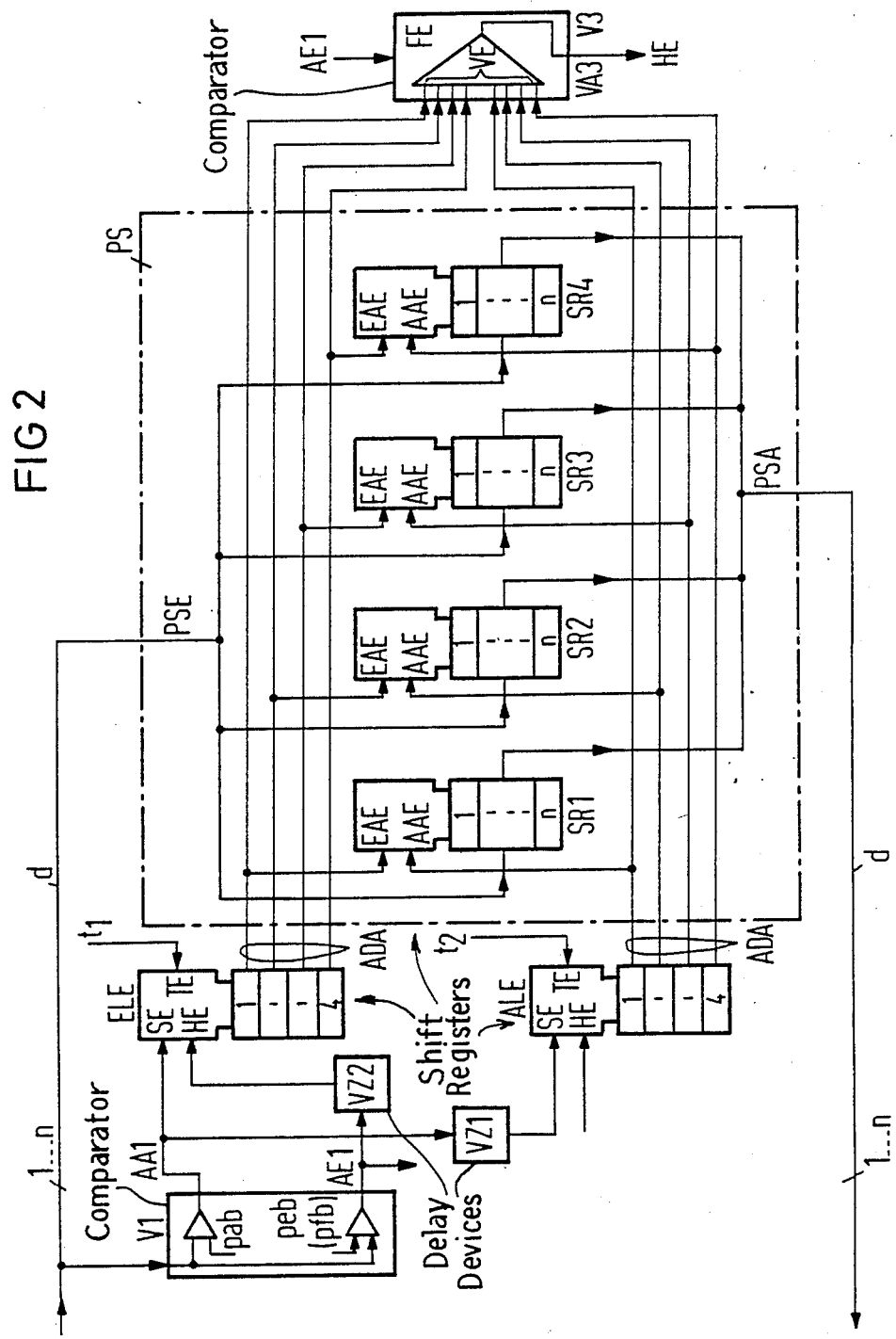

METHOD AND APPARATUS FOR READING PACKET-ORIENTED DATA SIGNALS INTO AND OUT OF A BUFFER

BACKGROUND OF THE INVENTION

1. Field of the Invention

The present invention is directed to a method for controlling the write-in and read-out of data signals transmitted serially or in parallel on a network packet-oriented with a determined maximum plurality of bits per packet into and out of a buffer cyclically addressable by memory location and provided with data input and data output in a station connected to the network via a network access controller. The processing clock frequency of the station approximately corresponds to the serial or parallel data bit clock rate, whereby a packet start bit combination and a packet end bit combination and/or bit combinations indicating stuffing information between the data packets are insertable and the size of the buffer is adapted to the maximum deviation between the processing clock frequency and the data transmission rate as well as to the maximally-occurring jitter.

2. Description of the Prior Art

An exchange of digital data signals is occurring to an increasing degree in communications and in data processing technology at transfer locations or, respectively, interfaces between systems, system components, etc., for example between two subscriber stations connected to a public or private network. In terms of bit clock frequency and phase relation, the data signals transmitted from one system to another system and received at the latter usually do not agree with the bit clock frequency and phase relation of the processing clock of the receiving system. These deviations are primarily caused by the clock frequency deviations of the clock oscillators implemented in the systems. When the distance between the two systems requires a transmission of the data signals by way of standard transmission technology then, caused for example by noise voltage influences, transient responses in synchronizing devices, etc., the bit clock frequency deviations can slightly increase and the phase fluctuations, also referred to as jitter, can considerably increase. The jitter is generally defined as phase fluctuation about the characteristic points in time of a digital signal or, respectively, about the ideal, equidistant points in time. A possibility of matching the bit clock frequency and the phase relation of the data signals to that of the processing clock of the receiving system is represented by the insertion of a buffer between the transfer location and the further-processing system components. The received data signals are thereby written into the buffer memory with the data bit clock derived from the data signals and are, in turn, read out from the buffer with the processing system clock after a prescribed time adapted to the maximum clock frequency and phase deviation. The write-in and read-out usually occurs with devices which generate memory location addresses and produce write-in and read-out signals, the write-in and read-out and address inputs of the buffer being selected with these devices. The write-in or, respectively, read-out procedure is usually initialized by a specific initialization procedure which sequences before the write-in or, respectively, read-out event. Buffers controlled in this manner are known, for example, from time-division multiplex data transmission systems, particularly pulse code modulation (PCM) transmission systems, or from access equipment of data processing systems, whereby the data signals may also exist in parallel and the adaptation then occurs in a parallel buffer, for example in a 1-byte buffer. The introduction of packet-oriented data transmission or, respectively, processing technology and, therefore, of the burst or, respectively, packet transmission of data signals requires initialization and termination procedures of the write-in and read-out events of the buffer adapted to this technology given simultaneous consideration of continuously increasing transmission rates of the data signals. A predetermined packet start or, respectively, packet end bit combination defines the beginning and, respectively, end of an individual data packet. Bit combinations indicating stuffing information can be inserted between the individual data packets in order to recognize, for example, operational or down status.

SUMMARY OF THE INVENTION

An object of the present invention is to provide a method and an apparatus with which the write-in and, respectively, the read-out of packet-oriented data signals present serially or in parallel into and out of a buffer addressable by memory locations is initialized and terminated packet-related at the earliest possible point in time.

Proceeding on the basis of the method initially set forth, the above object is achieved and is characterized in that the write-in of the serial or parallel data signals into the buffer controlled by the memory location addresses and clocked by the data bit clock is initiated after the identification of the presence of a packet start bit combination at the data input of the buffer and is terminated after the identification of the presence of a packet end bit combination or of a bit combination indicating stuffing information. It is further characterized in that the read-out of the data signals from the buffer controlled by memory location addresses and clocked by the processing clock is initiated after a prescribed time delay following the identification of the presence of a packet starting bit combination, the time delay representing approximately half the clock steps of a buffer cycle covering the addressing of all memory locations. Furthermore, the read-out of the data signals from the buffer controlled by memory addresses and clocked by the processing clock is terminated either after the identification of the presence of a packet end bit combination and/or bit combination indicating stuffing information at the data output of the buffer, or dependent on the presence of a packet end bit combination or bit combination indicating stuffing information at the data input of the buffer after the identification of the address equality of the buffer address of the packet end bit combination most recently read into the buffer and/or of the most recent bit combination indicating stuffing information and the buffer address of the buffer location currently to be read.

The advantage which may be obtained in practicing the present invention is, in particular, that the write-in or, respectively, read-out can be initialized or, respectively, terminated at the earliest possible point in time after the reliable recognition of a packet start or, respectively, packet end, due to the evaluation of the packet start bit combination or, respectively, of the packet end bit combination. Furthermore, the write-in and, respectively, the read-out event is limited to the duration of a packet. As a result thereof, the size of the buffer can be considerably reduced since only the bit clock frequency deviations and phase deviations occurring in a relatively short packet duration, in comparison to data signals to be continuously transmitted, for example, in time-division multiplex systems have to be compensated. This is also true of data practice between which bit combinations indicating stuffing information are inserted. The write-in of the data signals into the buffer and the read-out of the data signals from the buffer are thereby respectively terminated after the recognition of the bit combination indicating stuffing information and the most recently addressed memory location which contains the bit combination indicating the stuffing information is subsequently continuously read until a further, incoming data packet reinitializes or, respectively, re-terminates the write-in or, respectively, read-out events. The read-out of the data signals from the buffer is terminated when either a packet end bit combination or a bit combination indicating a stuffing information is identified at the data output of the buffer or when the memory location address of the data signals most recently read-in coincides with the memory location address of the data signals currently being read, assuming a packet end bit combination or a bit combination indicating stuffing information was identified at the data input of the buffer. As such, the packet end bit combination and the stuffing information function as packet termination bit combinations. Two arrangements are set forth for implementing the method and are directed to the aforementioned alternatives in view of the termination of the read-out of the data signals from the buffer.

The first arrangement is characterized in that a data line or, respectively, data lines carrying serial or, respectively, parallel data signals is, or, respectively, are connected to the data input or, respectively, data inputs of a buffer and to a first comparator identifying the packet start bit combination and packet end bit combination or bit combination indicating stuffing information. That output of the first comparator indicating the packet start is connected to a start input of a write-in device cyclically generating the memory addresses and is connected to a start input of a read-out device cyclically generating the memory addresses, being connected to the latter by way of a first delay device provided with a defined delay time. That output of the first comparator indicating the packet end and/or the stuffing information is connected to a stop input of the write-in device by way of a second delay device provided with a second, prescribed delay time. Data outputs of the buffer comprising serial or parallel structure are connected to one another and to a second comparator identifying the packet end bit combination and/or the bit combination indicating stuffing information and can be continued on to further-processing devices. An output of the second comparator indicating the packet end and/or the stuffing information is connected to a stop input of the read-out device. The address outputs of the read-in or read-out device are fed to read-in or, respectively, read-out address inputs of the buffer.

The second arrangement for implementing the method is characterized in that data lines comprising serial or, respectively, parallel data signals are connected to a data input or, respectively, data inputs of a buffer and to a first comparator identifying the packet start and packet end bit combinations or a bit combination indicating filler information. An output of the first comparator indicating the packet start is connected to a start input of a write-in device cyclically generating the memory addresses and is connected to a start input of a read-out device cyclically generating the memory addresses, being connected to the latter via a first delay device provided with a defined delay time. An output of the first comparator indicating the packet end and/or the stuffing information is connected to a stop input of the write-in device via a second delay device provided with a second, prescribed delay time and, secondly, is connected to an enable input of a third comparator, half of whose comparison inputs are connected to address outputs of the write-in device and half of whose comparison inputs are connected to the read-out device and whose comparator output is connected to a stop input of the read-out device.

An improvement may be realized in the second arrangement in that the comparators can be realized with bit-comparing integrated circuits.

An improvement in both arrangements is characterized in that the delay device can be realized with clocked registers.

A further improvement in both arrangements is characterized in that the write-in and read-out devices can be realized with clocked shift registers.

The aforementioned possible realizations are aimed at a utilization of the method and networks, for example ring network, insofar as the individual components, such as buffer, write-in device, read-out device and comparator can be realized with integrated circuits operating at high clock rates, i.e. above 10 MHz. The two exemplary embodiments of the invention shall be set forth in greater detail below with reference to the drawings.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of an arrangement for implementing the method of the invention wherein the read-out of the buffer is terminated after the identification of the presence of a packet end bit combination or of a bit combination indicating stuffing information; and FIG. 2 is a block circuit diagram of an arrangement for the implementation of the method wherein the read-out of the buffer is terminated when the memory location address of the data signals most recently write-in coincides with the memory location address of the data signals currently being read, assuming a packet end bit combination or a bit combination indicating stuffing information was identified at the data input of the buffer.

DESCRIPTION OF THE PREFERRED EMBODIMENTS

FIG. 1 illustrates a buffer memory PS constructed of four shift registers SR1 . . . SR4, whereby each shift register SR contains registers serially following one another. For example, such a shift register SR can be realized with an integrated circuit of the type SN 74 AS 821 containing 10 serially-connected registers and manufactured by the Texas Instruments Company. This integrated circuit further contains a write-in address input EAE and a read-out address input AAE. A positive signal edge change of an input signal at the write-in address EAE effects the simultaneous read-in of the data signals d present at the 10 shift register inputs. By analogy therewith, a positive signal edge change at the read-out address input AAE of the shift register SR effects a simultaneous read-out of the information respectively present in the registers at the respective output of the register. Each of the data inputs of the shift register SR is connected to the data inputs exhibiting the same ordinal number 1 ... n is all shift registers. By analogy therewith, all data outputs of the shift registers SR are connected to one another. The data inputs or, respectively, data outputs connected to one another in this manner therefore represent a 10-bit parallel data input PSE and a 10 bit parallel output PSA of the buffer PS. In order to avoid a mutual influencing of the data outputs of the shift registers SR, those data outputs of the shift registers SR which are not situated in a read-out condition are switched inactive or, respectively are disconnected from voltage.

Each write-in address input EAE of the shift registers SR is fed by way of an appropriate connection to an address output ADA provided with the same ordinal number and a read-in device ELE. The read-in device ELE is realized with a shift register constructed of four registers connected in succession. The shift register representing the write-in device ELE further comprises a start input SE and a hold input HE as well as a clock input TE. Clock signals $t_1$ whose bit clock frequency is derived from the data signals d incoming to the buffer input PSE are supplied to the clock input TE. The data inputs (not shown) of the write-in device ELE are connected in such a manner that, after a start information has been applied to the start input SE of the write-in device ELE, the data outputs or, respectively, address outputs ADA comprise an information effecting the read-out of the respectively selected shift register SR, comprising this information in a prescribed, constantly repeating sequence. Each read-out address input AAE of the shift registers SR of the buffer PS is connected to a data output or, respectively, address output ADA of a read-out device ALE. The read-out device ALE is again realized with a shift register which is formed of four registers connected in succession. Here, also, the inputs of the shift register are connected in such a manner that an information effecting the reading of the shift register SR of the buffer PS is applied at the address outputs ADA in a prescribed, constantly repeating sequence. Likewise, the shift register representing the read-out device ALE comprises a start input SE, a hold input HE and a clock input TE. A clock signal $t_2$ which corresponds to a processing clock signal of a device for further processing of the data signal d is supplied to this clock input TE.

The n-pole data line, selected as n=10 in this exemplary embodiment, is connected to the buffer input PSE and is additionally connected to an n-pole input of a first comparator V1. In the first comparator V1, the incoming data signal d are examined for the presence of a packet start combination pab and for a packet end bit combination peb. When a packet start bit combination pab is identified, then an information representing this state is applied to an output AA1 indicating the packet start. By analogy therewith, an information representing the corresponding state is applied to an output AE1 indicating the packet end when a packet end bit combination peb is identified. The output AA1 indicating a packet start is connected to the start input SE of the read-in device ELE and is connected to the start input SE of the read-out device ALE by way of a first delay device VZ1. The output AE1 of the first comparator V1 indicating a packet end is connected to an input of a second delay device VZ2 whose output is connected to the hold input HE of the write-in device ELE. The n-pole (already defined as n=10 in this exemplary embodiment) data output PSA of the buffer PS is connected to an n-pole input of a second comparator V2 as well as to a device (not shown) which further-processes the data signals d. In this second comparator V2, the data signals d present at the data output PSA of the buffer PS are investigated for the presence of a packet end bit combination peb. The identification of such a packet end bit combination peb is signaled at an output AE2 of the second comparator V2 by outputting an information representing the state. The output AE2 of the second comparator V2 indicating the packet end is connected to the hold input HE of the read-out device ALE.

The packet-oriented data signal d provided with packet start and packet end bit combinations pab, peb which are serially transmitted, for example, in a ring-shaped network proceed via a series-to-parallel converter (not shown) to the 10-bit parallel data input PSE of the buffer PS and to the input of the first comparator V1. Simultaneously with the recognition of a packet start bit combination pab, the write-in of the packet start bit combination pab and of the following data signals d into the buffer PS beginning with one of the four shift registers SR is initialized via that output AA1 of the first comparator V1 indicating the packet start and via the start input SE of the write-in device ELE. After a time delay prescribed in the first delay device VZ1, the read-out of the data signals d read into the buffer PS is initialized via the start input SE of the read-out device ALE. This first time delay is adapted to the buffer size and, therefore, to the maximum deviation between the data bit clock $t_1$ derived from the data signals d and internal processing clock $t_2$, caused by the clock oscillator deviations and jitter. After the identification of the packet end bit combinations peb in the first comparator V1, the hold input HE of the write-in device ELE is selected via the output AE1 of the comparator V1 indicating a packet end and via a second delay device VZ2, whereby the read-in event is terminated after the write-in of the packet end bit combination peb. The second time delay is required in order to guarantee a reliable write-in of the packet end bit combinations peb. When a packet end bit combination peb then proceeds to the data output PSA of the buffer PS, then the presence of this packet end bit combination peb is identified in the second comparator V2 and the read-out of the buffer PS is terminated via its output AE2 and by way of the hold input HE of the read-out device ALE. When bit combinations pfb indicating stuffing information are inserted between the individual data packets, then the data signals d can be investigated for the presence of these bit combinations both in the first comparator V1 and in the second comparator V2. The advantage of this modification is that, after the write-in and read-out of the data signals d, a bit combination indicating the filling or stuffing information is available at the data output PSA of the buffer PS and, therefore, is constantly forwarded to the further-processing device. This bit combination indicating stuffing information is applied until a further packet start bit combination pab is recognized and a new write-in event or, respectively, read-out event is initialized or, respectively, terminated.

FIG. 2 illustrates an identical buffer PS constructed with the same integrated circuit technology, shows a write-in device ELE, a read out device ALE and a first comparator V1. Both the connections between these components as well as the functions of the individual components correspond to the connections and functions shown or, respectively, set forth with respect to FIG. 1. The second comparator V2 is replaced by a third comparator V3 whose inputs are connected to the address outputs ADA of the read-in device ELE and to the address outputs ADA of the read-out device ALE. Furthermore, that output AE1 of the first comparator V1 indicating the packet end is connected to a further, enable input FE of the third comparator V3. Assuming that a packet end bit combination peb or a bit combination pfb indicating stuffing information has been recognized, a hold signal is generated in the comparator V3 given equality of the information at the address outputs ADA of the write-in device ELE and of the read-out device ALE, and this hold signal is supplied by way of an output VA3 of the third comparator to the hold input HE of the read-out device ALE. This means that the buffer PS is read-out until the memory location address most recently generated for the write-in of the data signal d corresponds to the current read-out memory location address, assuming a packet end bit combination peb or bit combination pfb indicating stuffing information was identified in the first comparator V1 and this condition has been communicated to the third comparator V3.

Possible realizations of the system components are set forth below.

| Buffer PS | SN 74 AS 821 | Circuit of Texas Instruments |
| Write in and Read out means ELE, ALE | 74 F 194 | |
| Comparator V1, V2, V3 | 74 F 521 | |
| Delay means VZ1, VZ2 | 74 F 109 | Circuits of the advanced Schottky TTL Technology of Fairchild |

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for controlling the write-in and read-out of packet-oriented data signals having a data clock rate, said data signals transmitted serially or in parallel on a ring network into and out of a buffer having a data input and a data output, said buffer being part of a station connected to the ring network and wherein said data clock rate approximately corresponds to a processing clock rate of the station, said processing clock rate and said data clock rate being within a known maximum deviation, each packet-oriented data signal transmission having a packet start bit combination and a packet termination bit combination, said buffer having a size adapted to said known maximum deviation and further adapted to a maximally-occurring jitter between said processing clock rate and said data clock rate, said method comprising the steps of:

monitoring each packet-oriented data signal transmission at said data input of said buffer to recognize said packet start bit combination and said packet termination bit combination;

generating data-clocked memory location addresses, upon detection of said packet bit start combination, at a rate corresponding to said data clock rate of said packet-oriented data signals;

initiating write-in of said packet-oriented data signals into said buffer under control of said data-clocked memory location addresses generating read-out clocked memory addresses for reading said packet-oriented data signals from said buffer after a predetermined time delay following recognition of said packet start bit combination at said input of said buffer, said predetermined time delay corresponding to a time interval approximately equal to one-half of a buffer cycle, said read-out clocked memory addresses being generated at a rate corresponding to said processing clock rate; and terminating said generating of said data-clocked memory location addresses in response to recognition of said packet termination bit combination at said input of said buffer, termination of said generating of said data-clocked memory location addresses occurring after a further predetermined time delay corresponding to a time interval necessary to allow write-in of said packet termination bit combination to said buffer after recognition of said packet start bit combination at said input of said buffer; and terminating said generating of said read-out clocked memory addresses immediately after read-out of said packet termination bit combination from said output of said buffer.

2. The method of claim 1, further comprising the step of continuously reading said packet termination bit at said output of said buffer.

3. Apparatus for controlling the write-in and read-out of series or parallel packet-oriented data transmissions in a station in a ring network, each of said packet oriented data transmissions having a packet start bit combination and a packet termination bit combination and further having a data transmission rate, said station having a processing clock having a processing clock rate approximately corresponding to said data clock rate, said apparatus comprising:

a buffer having a plurality of addressable memory locations equal in number to account for a known maximum deviation between said data transmission rate and said processing clock rate and further to account for a maximum occurring jitter, said buffer having data inputs for receiving said packet-oriented data transmissions, data outputs for providing said packet-oriented data transmissions for further processing at a rate corresponding to said processing clock rate, and write-in address inputs and read-out address inputs;

first comparator means connected to said data inputs of said buffer, having first and second outputs, and data corresponding to said packet start bit and said packet termination bit combinations supplied thereto, said first comparator means operable to provide a first signal at said first output in response to recognition of said packet start bit combination at said data inputs of said buffer and a second signal at said second output in response to recognition of said packet termination bit combination at said data inputs of said buffer;

write-in address generating means having a start input, a stop input, a data clock input and write-in address outputs, said start input connected to said first output of said first comparator means, said write-in addressing generating means operable in response to said first signal to cyclically produce memory location addresses at said write-in address outputs to said write-in address inputs of said buffer;

read-out address generating means having a start input, a stop input, a processing clock input and read-out address outputs;

second comparator means including an input connected to said data outputs of said buffer, and an output, said second comparator means having data corresponding to said packet termination bit combination supplied thereto and operable in response to equality between said data outputs of said buffer and said packet termination bit combination to provide a stop signal at said output of said second comparator, said output of said second comparator means connected to said stop input of said read-out address generating means for terminating cyclic generation of read-out address outputs by said read-out address generating means to said read-out address inputs of said buffer in response to said stop signal;

first delay means, having a first predetermined time delay, connecting said second output of said first comparator to said stop input of said write-in address generating means for terminating cyclic generation write-in address generation after said first predetermined time delay after generation of said second signal, said first predetermined time delay corresponding to a time interval necessary to write-in said packet termination bit combination to said buffer after recognition of said packet termination bit combination by said first comparator; and second delay means, having a second predetermined delay time, connecting said first output of said first comparator means to said start input of said read-out address generating means to initiate read-out address generation after said second predetermined time after generation of said second signal, said second predetermined time delay corresponding to corresponding to a time interval approximately equal to one-half of a buffer cycle.

4. The apparatus of claim 3, wherein each of said first and second comparators comprises bit-comparing integrated circuits.

5. The apparatus of claim 3, wherein each of said first and second delay means comprises a clocked register.

6. The apparatus of claim 3, wherein each of said write-in and read-out address generating means comprises a clocked shift register.

7. Apparatus for controlling the write-in and read-out of series or parallel packet-oriented data transmissions in a station in a ring network, each of said packet oriented data transmissions having a packet start bit combination and a packet termination bit combination and further having a data transmission rate, said station having a processing clock having a processing clock rate approximately corresponding to said data clock rate, said apparatus comprising:

a buffer having a plurality of addressable memory locations equal in number to account for a known maximum deviation between said data transmission rate and said processing clock rate and further to account for a maximum occurring jitter, said buffer having data inputs for receiving said packet-oriented data transmissions, data outputs for providing said packet-oriented data transmissions for further processing at a rate corresponding to said processing clock rate, and write-in address inputs and read-out address inputs;

first comparator means having inputs receiving said data inputs of said buffer, first and second outputs, and having data corresponding to said packet start bit and said packet termination bit combinations supplied thereto, said first comparator means operable to provide a first signal at said first output in response to recognition of said packet start bit combination at said data inputs of said buffer and a second signal at said second output in response to recognition of said packet termination bit combination at said data inputs of said buffer;

write-in address generating means having a start input, a stop input, a data clock input and write-in address outputs, said start input connected to said first output of said first comparator means, said write-in addressing generating means operable in response to said first signal to cyclically produce memory location addresses at said write-in address outputs to said write-in address inputs of said buffer;

read-out address generating means having a start input, a stop input, a processing clock input and read-out address outputs;

second comparator means including first inputs connected to said write-in address outputs of said write-in address generating means, second inputs connected to said read-outs of said read-out address generating means, and an output connected to said stop input of said read-out address generating means, said comparator operable to generate a stop signal at said output of said second comparator means to terminate cyclic generation of said read-out address outputs from said read-out generating means to said read-out address inputs of said buffer upon equality of said read-out address outputs and said write-in address outputs;

first delay means, having a first predetermined time delay, connecting said second output of said first comparator to said stop input of said write-in address generating means for terminating cyclic generation write-in address generation after said first predetermined time delay after generation of said second signal, said first predetermined time delay corresponding to a time interval necessary to write-in said packet termination bit combination to said buffer after recognition of said packet termination bit combination by said first comparator; and second delay means, having a second predetermined delay time, connecting said first output of said first comparator means to said start input of said read-out address generating means to initiate read-out address generation after said second predetermined time after generation of said second signal, said second predetermined time delay corresponding to corresponding to a time internal approximately equal to one-half of a buffer cycle.

8. The apparatus of claim 7, wherein said first and second comparators comprise bit comparing integrated circuits.

9. The apparatus of claim 7, wherein said first and second delay means comprise clocked registers.

10. The apparatus of claim 7, wherein said write-in address generating means and said read-out address generating means comprise clocked shift registers.

11. The method of claim 1, further comprising the step of utilizing a packet end bit combination as said packet termination bit combination.

12. The method of claim 1, further comprising the step of utilizing a stuffing bit combination as said packet termination bit combination.

13. The method of claim 1, wherein said step of terminating said generating of said read-out clocked memory addresses is further defined by terminating said generating of said read-out clocked memory addresses in response to detecting said packet termination bit combination at said output of said buffer.

14. The method of claim 1, wherein said step of terminating said generating of said read-out clocked memory addresses is further defined by terminating said generating of said read-out clocked memory addresses in response to a coincidence between one of said read-out clocked memory addresses and one of said data-clocked memory location addresses.

15. An apparatus for reading and writing packet-oriented data signals into and out of a buffer, said apparatus comprising:

a buffer having a plurality of addressable memory locations, an input for writing packet-oriented data transmissions and an output for reading-out packet oriented data signals stored in said buffer, said packet-oriented data transmissions having a packet start bit combination and a packet termination bit combination and further having a data clock rate;

comparator means connected at said input of said buffer for generating a first control signal in response to detecting said packet start bit combination at said input of said buffer, and for generating a second control signal in response to detecting said packet termination bit combination at said input of said buffer;

first address generating means for cyclically generating input address locations to said buffer for write-in of said packet-oriented data transmissions, said input address locations cyclically generated at said data clock rate in response to said first control signal upon detection of said packet start bit combination by said comparator means;

first time delay means accepting said first control signal for delaying said first control signal to an output of said first delay means by a predetermined time delay corresponding to a time interval approximately equal to one-half of a buffer cycle;

second time delay means accepting said second control signal for delaying said second control signal to an output of said second delay means by a further predetermined time delay corresponding to a time interval necessary to write-in said packet termination bit combination to said buffer after detection of said packet termination bit combination by said comparator, said output of said second time delay means connected to said first address generating means for inhibiting generation of said input address locations in response to a delayed second control signal at said output of said second delay means;

second address generating means for cyclically generating output address locations to said buffer for read-out of said packet-oriented data transmissions, said output address locations cyclically generated in response to a delayed first control signal at said output of said first time delay means, said output address locations generated at a processing clock rate approximately corresponding to said data clock rate; and inhibit means for inhibiting cyclic generation of said output address locations by said second address generating means immediately after read-out of said packet terminating bit combination from said buffer.

16. An apparatus as recited in claim 15, wherein said inhibit means comprises a further comparator means for generating an inhibit signal to said second address generating means upon detecting said packet termination bit at said output of said buffer, said inhibit signal providing means for inhibiting cyclic generation of said output address locations by said second address generating means to said buffer.

17. An apparatus as recited in claim 15, wherein said inhibit means comprises a further comparator means for generating an inhibit signal to said second address generating means upon coincidence of an input address location generated by said first address generating means and an output address location generated by said second address generating means, said inhibit signal providing means for inhibiting cyclic generation of said output address locations by said second address generating means to said buffer.

* * * * *